United States Patent Office 3,051,534
Patented Aug. 28, 1962

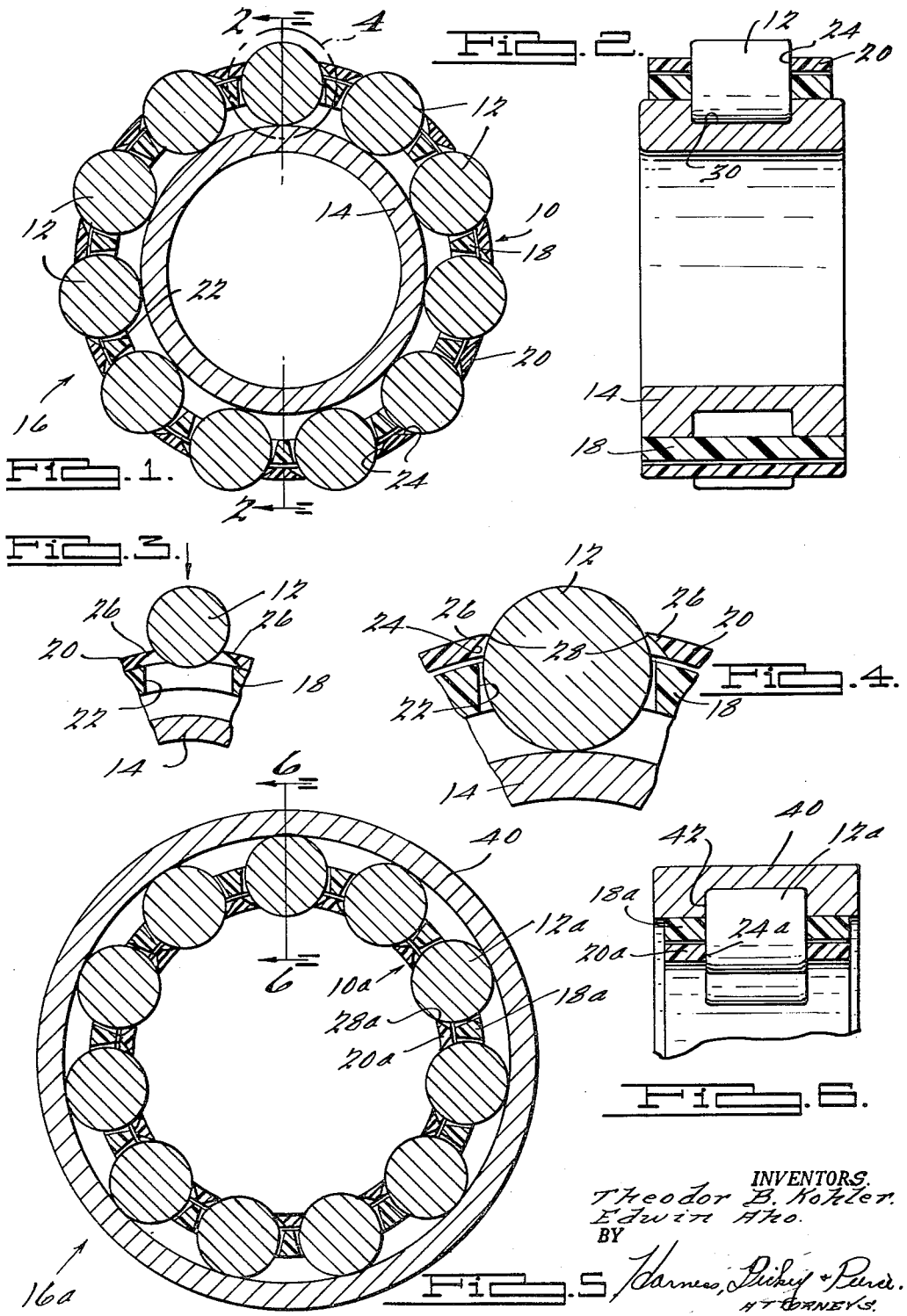

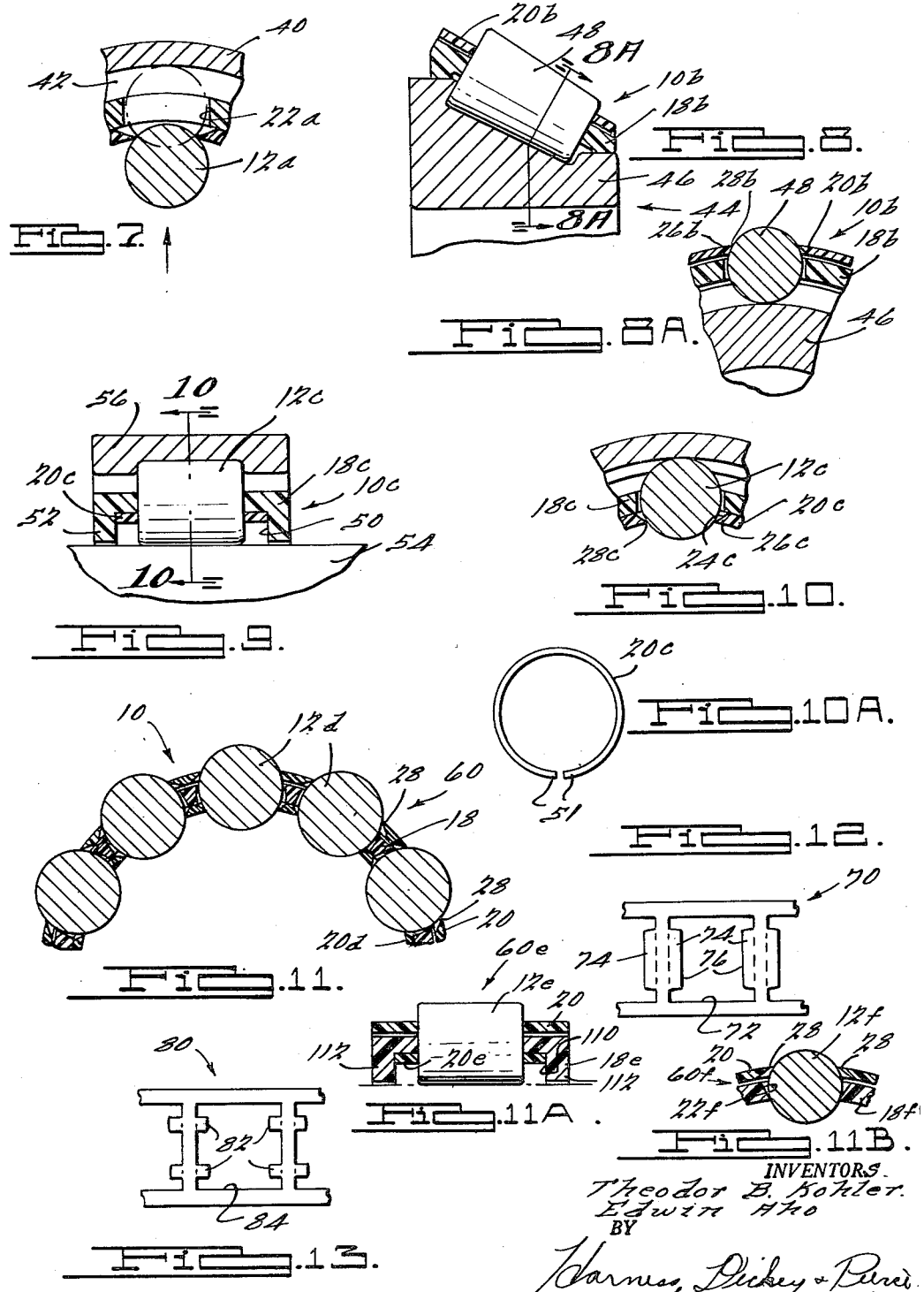

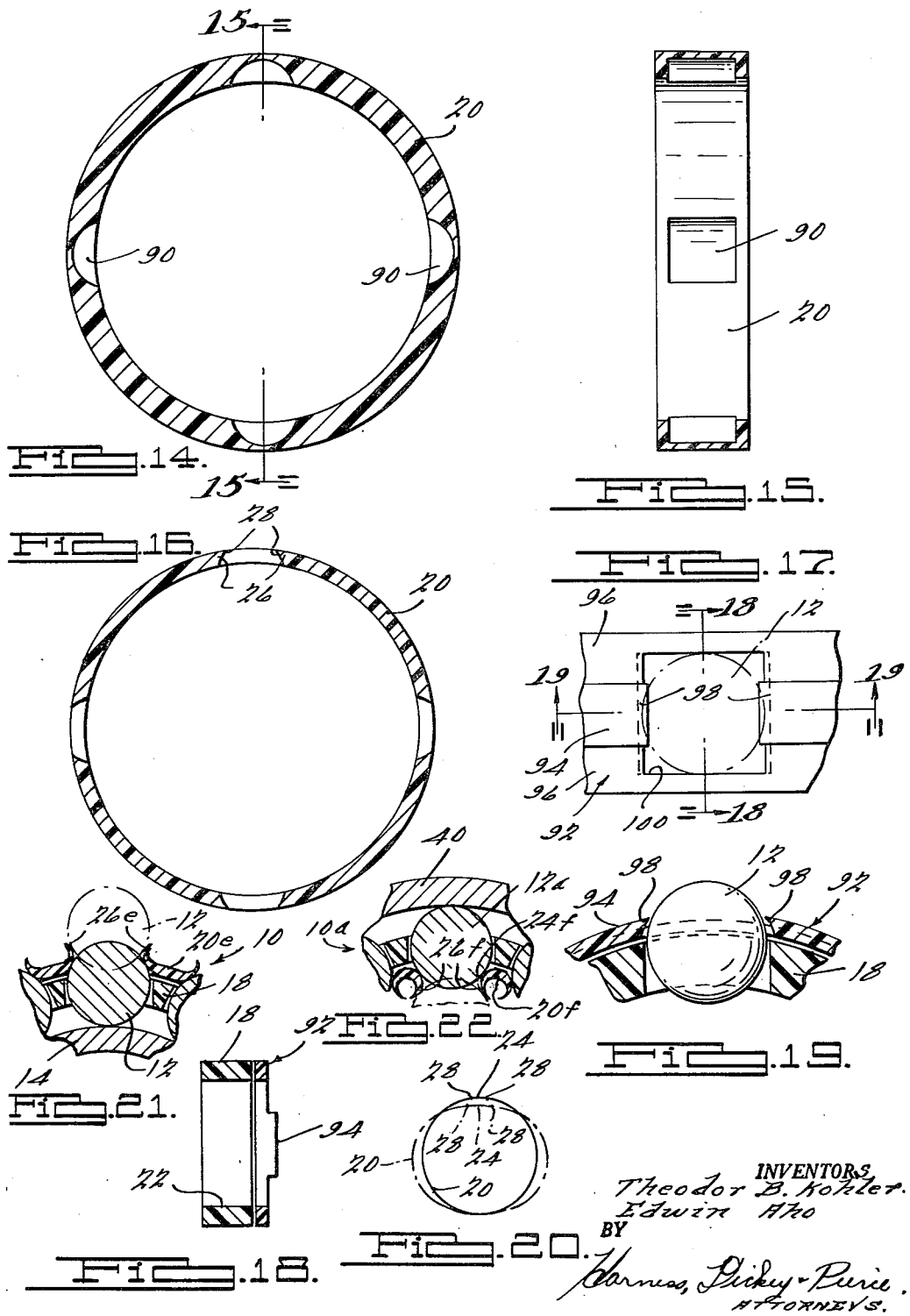

3,051,534
BEARING CAGE ASSEMBLY
Theodor B. Kohler, Detroit, and Edwin Aho, Center Line, Mich., assignors to Federal-Mogul-Bower Bearings, Inc., Detroit, Mich., a corporation of Michigan
Filed Jan. 18, 1960, Ser. No. 3,070
17 Claims. (Cl. 308—217)

This invention relates generally to roller bearings and more particularly to an improved cage assembly for roller bearings.

Most bearing cages are constructed so that one or more portions thereof must be deformed in order to assemble the cage with the rollers and, consequently, the choice of materials from which the bearing cage can be constructed is limited to materials which can be so deformed. It is an object of this invention, therefore, to provide a cage assembly which can be formed substantially any suitable cage material regardless of the brittleness of the material. This is accomplished by forming the cage assembly in two concentric parts, one part functioning to space the rollers apart in a direction circumferentially of the bearing and the other functioning to retain the rollers against movement radially of the bearing. No deformation of the circumferential spacing element is required so that the roller receiving pockets therein can be precision-shaped to provide a minimum clearance between it and rollers of any well known shape, i.e., straight cylindrical, tapered, hourglass, barrel or spherical. No substantial clearance is required to take care of deformation of the circumferential spacing element and, consequently, in the case of cylindrical rollers, the danger of the rollers becoming cocked in the pockets in the circumferential spacing element is eliminated. The radially retaining element is of a thin construction so that it can be deflected sufficiently to permit insertion of the rollers into the pockets in the circumferential spacing element, even when the radially retaining element is formed of a brittle material. The ratio of the diameter of the radially retaining element to the thickness thereof is sufficiently high, in the light of the material from which the radially retaining element is constructed, to permit the radially retaining element to be deflected enough to allow movement of the rollers through slots in the radially retaining element into the pockets in the circumferential spacing element. Sufficient diametrical clearance is provided between the two concentric elements to provide for assembly deflections of the radially retaining element sufficient to spread opposite side walls of each of the slots therein.

The radially retaining element is provided with thin tapering portions at opposite sides of the slots therein through which the rollers are inserted into the circumferential spacing element. These portions are tapered to a feather edge and by virtue of the fact that they are very thin, they will deflect sufficiently to enlarge the slots enough to permit passage of the rollers therethrough. The feather edges are smooth so that if they contact the rollers they will not scratch them and in the case of extremely brittle materials, the edges may be reduced in size so that only a portion of each edge can engage the rollers. The slots in the radially retaining element are of a size such that in the use of a bearing provided with the cage assembly of this invention, there is no running engagement of the feather edges with the rollers, for this would wear the edges such that they would not perform their intended retaining functions during handling of the bearing. In those instances in which the cage assembly is to be shaft-guided, the circumferential spacing element is grooved and the radially retaining element is split so that the diameter thereof can be momentarily reduced during assembly with the circumferential spacing element. The fact that the radially retaining element is of a large diameter to thickness ratio makes it possible to deflect it even though it is constructed of a very brittle material and the radially retaining element may be formed so that the feather edges are radially inwardly or outwardly curved so that the degree of deflection required during mounting of the rollers in the cage assembly is reduced.

Further objects, features and advantages of this invention will become apparent from a consideration of the following description, the appended claims and the accompany drawing in which:

FIGURE 1 is a sectional view of an inner race, cage and roller bearing assembly provided with the cage assembly of this invention;

FIGURE 2 is a sectional view looking substantially along the line 2—2 in FIG. 1;

FIGURE 3 is a fragmentary sectional view illustrating the manner in which a roller is assembled with the cage assembly of this invention;

FIGURE 4 is an enlarged fragmentary view of the encircled portion of FIG. 1 indicated by the numeral "4";

FIGURE 5 is a sectional view, illustrated similarly to FIG. 1, of an outer race, cage and roller bearing assembly provided with the cage assembly of this invention;

FIGURE 6 is a fragmentary sectional view looking substantially along the line 6—6 in FIG. 5;

FIGURE 7 is a fragmentary sectional view illustrating the manner in which a roller is assembled with the cage assembly of this invention in the bearing shown in FIG. 5;

FIGURE 8 is a fragmentary sectional view showing a tapered cone, cage and roller bearing assembly provided with the cage assembly of this invention;

FIGURE 8A is a fragmentary sectional view as seen along the line 8A—8A in FIG. 8;

FIGURE 9 is a fragmentary sectional view showing an outer race, cage and roller bearing assembly provided with a cage assembly of this invention which is shaft-guided;

FIGURE 10 is a fragmentary sectional view looking along the line 10—10 in FIG. 9;

FIGURE 10A is an elevational view of the radially retaining element in the assembly shown in FIG. 9;

FIGURE 11 illustrates a cage and roller assembly constructed in accordance with this invention;

FIGURE 11A is a transverse sectional view of a modified form of the assembly shown in FIG. 11;

FIGURE 11B is a fragmentary sectional view of another modified form of the cage and roller assembly shown in FIG. 11;

FIGURES 12 and 13 are fgragmentary elevational views of modified forms of the radially retaining element in the cage assembly of this invention in which the feather edge portions of the radially retaining element are reduced in size;

FIGURE 14 is a sectional view of a ring member showing an intermediate stage in the forming of the ring member into a radially retaining element in the cage assembly of this invention;

FIGURE 15 is a transverse sectional view looking along the line 15—15 in FIG. 14;

FIGURE 16 illustrates the final form of the ring shown in FIG. 14 shaped to form the radially retaining element in the cage assembly of this invention;

FIGURE 17 is a fragmentary elevational view of a modified form of the radially retaining element in the cage assembly of this invention which is also shaped so that it is adapted for assembly with rollers which are of a ball shape;

FIGURES 18 and 19 are sectional views looking along the lines 18—18 and 19—19, respectively, in FIG. 17;

FIGURE 20 is a diagrammatic view illustrating the effect on the transverse dimension of a slot in the radially retaining element when the element is diametrically deflected; and FIGURES 21 and 22 are sectional views of the assemblies shown in FIGS. 1 and 5, respectively, provided with modified forms of the radially retaining element.

With reference to the drawing, one form of the cage assembly of this invention, indicated generally at 10, is illustrated in FIG. 1 in assembly relation with a plurality of rollers 12 and an inner race member 14 so as to form an inner race, cage and roller bearing assembly 16. The cage assembly 10 is formed in two parts and consists of a first annular element 18 which functions to space the rollers 12 in a direction circumferentially of the bearing 16, and a second annular element 20 which extends about and is concentric with the circumferential spacing element 18. The element 20 is disposed outwardly beyond the cylinder defined by the axes of the rollers 12 so that it functions to retain the rollers 12 against movement in a direction radially outwardly of the bearing 16.

The circumferential spacing element 18 is of a uniform thickness and is formed with circumferentially spaced pockets or slots 22 which are of a size such that the rollers 12 may be positioned therein with a very small clearance between the rollers 12 and the element 18. The number of pockets 22 provided in the element 18 is dependent upon the number of rollers 12 which are to be included in the bearing 16, and one pocket 22 is provided for each roller 12. The rollers 12 may be of any well known shape, namely, straight cylindrical, hourglass, barrel, or spherical, and are illustrated as being of straight cylindrical shape only for convenience. In each case, the pockets 22 are formed so that the roller 12 will be positioned therein with a minimum clearance between the pocket walls and the rollers to prevent any cocking of skewing of the rollers 12 in the pockets 22.

The radially retaining element 20 is much thinner than the circumferential spacing element 18 and is of an inner diameter slightly greater than the outer diameter of the element 18 so that some deflection of the element 20, in a direction diametrically thereof, is obtainable for a purpose to appear presently. As shown in FIGS. 2 and 4, the element 20 is formed with a plurality of slots 24 which are of a generally rectangular shape and are of a width slightly less than the diameter of the rollers 12. Each slot 24 is bounded on the opposite edges thereof, which are spaced in a direction circumferentially of the element 20, by portions 26 of the element 20 which are tapered so that they terminate in a feather edge 28. In other words, the portions 26 of the element 20 on transversely opposite sides of each slot 24 are tapered to a feather edge 28 disposed on the outer circumference of the element 20.

To assemble the rollers 12 with the inner race 14 and the cage assembly 10, the cage assembly 10 is first positioned concentrically about the inner race 14, which is provided on its outer surface with a groove 30 of a size to receive the rollers 12. The element 20 is manipulated so that the slots 24 therein are in radial alignment with the pockets 22 in the element 18. The rollers 12 are then assembled one by one with the assembly 10 and the inner race 14 by first positioning one roller 12 in radial alignment with a radially aligned slot 24 and a pocket 22 as shown in FIG. 3. The roller 12 is then forced radially inwardly of the assembly 10 with the edge portions 26 of the retaining element 20 deflecting radially inwardly sufficiently to permit travel of the roller 12 through the slot 24 into the pocket 22 and into the groove 30 as shown in FIGS. 2 and 4. The edge portions 26 then deflect in a reverse direction to their original positions, as soon as the largest portion of the roller 12 has traveled past the feather edges 28, so that the edge portions 26 function to prevent reverse movement of the roller 12 in a direction out of the pocket 22. The construction of the element 20 so that it has an inner diameter greater than the outer diameter of the element 18 and is thus diametrically deflectable facilitates movement of a roller 12 through a slot 24. When the radially retaining element 20 is deflected so that a portion thereof at the center of a slot 24 is moved radially inwardly of the element 20, the feather edges 28 are moved further apart as this portion of the element 20 approaches a flat planar position, as shown diagrammatically in FIG. 20. The extent of widening of the slot 24 as a result of diametrical deflection of the element 20 is exaggerated in FIG. 20 to better illustrate this result.

It can thus be seen that the construction of the radially retaining element 20 so that it has a high diameter to thickness ratio and has the portions 26 at transversely spaced sides of each slot 24 of a tapered shape, provides for sufficient deflection of the edges 26 to permit passage of the roller 12 in one direction through the slots 24. Consequently, the rollers 12 are readily assembled one by one with the assembly 10 and, once assembled, are firmly held in the pockets 22.

The extent to which the edge portions 26 overlap the rollers 12 varies with different size rollers 12. For heavier rollers, the edge portions 26 must carry a greater load, during handling and installation of the bearing 16, and, therefore, must extend inwardly over the roller 12 a greater extent than is the case with smaller, lighter rollers 12. The bearing 16 is of precision type so that in use, the feather edges 28 are spaced from the rollers 12 to prevent wear of the feather edges 28, since worn edges might permit the rollers 12 to fall out of the bearing 16 after removal of the bearing 16 from its assembled position. The pockets 22 can be formed to provide a minimum clearance with the rollers 12 since no excess clearance must be initially provided to take care of deformation of the circumferential spacing element 18 during assembly with the rollers 12.

In FIG. 5, another form of the cage assembly of this invention, indicated generally at 10a, is illustrated in an outer race, cage and roller bearing assembly 16a. The bearing 16a includes the assembly 10a, which is similar to the assembly 10 and, therefore, has corresponding parts designated by corresponding numerals with the letter suffix "a" added, rollers 12a, and an outer race member 40 having a groove 42 in its inner surface. The assembly 10a includes a circumferential spacing element 18a, which functions like the corresponding element 18 in the bearing 16, and a radially retaining element 20a which functions like the corresponding element 20 in the bearing 16 but is positioned concentrically within the element 18a since in the bearing 16a, the element 20a retains the rollers 12a against movement radially inwardly of the bearing 16a. The element 20a is similar to the element 20 but has the feather edges 28a at opposite sides of the slots 24a disposed on the inner circumference of the element 20a instead of on the outer circumference as in the element 20.

In the assembly of the rollers 12a with the elements 18a and 20a, the parts are initially positioned radially of and in radial alignment with a slot 24a and a pocket 22a, as shown in FIG. 7. The roller 12a is then moved radially outwardly of the elements 20a and 18a so to deflect the feather edges 28a radially outwardly sufficiently to permit travel of the roller 12a between the edges 28a to a position within the pocket 22a and within the groove 42 in the outer race 40. The element 20a has its outer diameter slightly less than the inner diameter of the element 18a so that when a portion of the element 20a is forced against a larger diameter portion on the inner surface of the element 18a, the opposite edges 28a of the slot 24a are spread apart to facilitate assembly of the roller 12a with the element 20a.

It can thus be seen that the assembly 10a has all of the advantages listed above for the assembly 10 and is usuable with an outer race member 40.

In FIG. 8, another form 10b of the cage assembly of this invention is illustrated in a tapered bearing 44 which includes a tapered cone 46 and tapered rollers 48. The assembly 10b, which is similar to the assembly 10 and, therefore, has corresponding parts designated by corresponding numerals with the letter suffix "b" added, includes a circumferential spacing element 18b and a radially retaining element 20b. The elements 18b and 20b are of varying diameters in a direction axially thereof, as shown in FIG. 8, and retain the rollers 48 in circumferentially spaced positions on the cone 46 in the same manner that the corresponding elements 18 and 20 maintain the rollers 12 on the inner race 14 in FIG. 1.

In FIGS. 9 and 10, a form 10c of the cage assembly of this invention is illustrated in which the circumferential spacing element 18c is formed on its inner surface with a groove 50 to thereby form a pair of inwardly extending annular rims 52 on opposite sides of the groove 50 which are engageable with a shaft extending axially of the element 18 and a portion of which is shown at 54 to provide for a shaft-guiding of the assembly 10c. The assembly 10c, which is similar to the assembly 10 and, therefore, has corresponding parts designated by corresponding numerals with the letter suffix "c" added, includes a radially retaining element 20c that is formed with slots 24c having tapered portions 26c which terminate in feather edges 28c. The element 20c is split as shown in FIG. 10A so that it can be manipulated so that opposite ends 51 thereof can be overlapped to reduce the diameter of the element 20c sufficiently to enable it to be moved across a rim 52 and disposed within the groove 50 for retaining bearings 12c in positions in which they are in rolling engagement with the outer race member 56. By virtue of the fact that the radially retaining element 20c is of a large diameter to thickness ratio, it can readily be momentarily deflected to reduce the diameter thereof so that it is movable across the rim 52 into the groove 50 where it expands circumferentially into engagement with the element 18c along the groove 50 therein. The element 20c functions in a manner identical to the manner in which the element 20a functions to maintain the rollers 12c against movement radially inwardly of the element 20c. The rollers 12c are assembled with the assembly 10c in the same manner the rollers 12a are assembled with the assembly 10a.

In FIG. 11, a cage and roller assembly 60 is illustrated which consists of the cage assembly 10 previously described and a second radially retaining element 20d similar to the element 20a described earlier. The assembly 60 thus consists of a circumferential spacing element 18 and two radially retaining elements 20 and 20d and does not require any races. However, in this embodiment of the invention, since the circumferential spacing element 18 is not supported on a race, as in the embodiments of the invention shown in FIGS. 1, 5 and 8, the element 20d supports the element 18. For this reason element 20d is not provided with feather edges, like the edges 28a in element 20a, which would wear when they engaged the rollers 12d. In other words, assume the cage assembly shown in FIG. 11 is in a position in which its axis is horizontal and the rollers 12d are in engagement with a support. The lower side of the element 20d rides on the lower rollers 12d, the element 18 is supported on the element 20d and element 20 is supported on element 18 so that the feather edges 28 are spaced from rollers 12d. The roller members 12d can be assembled with the elements 18, 20 and 20d by movement radially inwardly of the assembly 60.

If desired, the functions of the elements 20 and 20d may be exchanged by forming the feather edges on the element 20d and forming the element 20 without the feather edges 28. In such case, the element 20 is supported on the rollers 12d, the element 18 is supported on element 20, element 20d is supported on element 18 and the rollers 12d are assembled with the assembly 60 by movement radially outwardly to deflect the feather edges on the element 20d.

In the modified cage and roller assembly 60e shown in FIG. 11A, the circumferential spacing element 18e is provided on its inner surface with a groove 110 to thereby form a pair of radially inwardly extending annular rings 112 on opposite sides of each roller 12e. The rims 112 are engageable with a shaft which extends axially of the assembly 60e and supports the rollers 12e to provide for a shaft guiding of the element 18e. The inner radially retaining element 20e is split, like the element 20c, so that it can be located between the rims 112. Since the element 18e is shaft-guided, both radially retaining elements 20e and 20 can be formed with slots having feather edges since both are supported on the element 18e.

In the modified cage and roller assembly 60f shown in FIG. 11B, the circumferential spacing element 18f is formed with roller-receiving slots 22f each of which is of a decreasing width in a direction radially inwardly of the element 18f. Each slot 22f is of a width at the inner periphery of the element 18f less than the diameter of the roller 12f disposed therein. As a result, in the assembly 60f the element 18f is supported on the rollers 12f and functions both as an inner radially retaining element and a circumferential spacing element for the rollers 12f. The outer radially retaining element 20 is supported on the element 18f and has slots which are provided with feathered edges 28. If desired, the openings 22f can be tapered in the opposite direction so that the element 18f functions as an outer radially retaining element, in which case an inner element like the element 20a is positioned concentrically within the element 18f.

FIG. 12 illustrates a modified form of radially retaining element 20 which is indicated generally by the numeral 70. The element 70 is provided with circumferentially spaced slots 72 each of which is formed on transversely opposite sides with tapered portions 74 each of which terminates in a feather edge 76. The portions 74 are like the portions 26 previously described but extend only partially of the full length of the slot 72, since each portion 74 occupies only an intermediate portion of the edge of each slot 72. Consequently, a reduced retaining effect of the portions 74 is obtained with respect to the effect obtained when the portion 26 extends over the full length of the slot 24 as in the element 20 previously described.

The form of the radially retaining element indicated at 80 in FIG. 13 is similar to the form 70 shown in FIG. 12 in that the transversely spaced tapered edge portions 82 of the slot 84 are of a reduced length relative to the portions 26 previously described. The portions 82 are tapered like the portions 26 and spaced apart and illustrated as being two in number on each side of the slot 84 so that they function as fingers, it being understood that more or less fingers 82 may be used if desired. The retaining elements 70 and 80 are particularly useful with materials which are extremely brittle and which might have a tendency to scratch the rollers 12 when they engage the rollers. Consequently, by reducing the area of possible engagement of the tapered portions and the rollers, the extent of possible scratching is reduced.

The radially retaining element 20 can be formed in a number of ways but one method of forming the element 20 is illustrated in FIGS. 14–16, inclusive. The element 20, which is initially of a uniform thickness ring shape, is first formed with dished-out cavities 90 on its inner surface which are rectangular in plan view as shown in FIG. 15. The cavities 90 are arcuate in cross-section as shown in FIG. 14 and are formed by a rotatable mill cutter or the like. The element 20 then has its outer surface ground so as to reduce the outer diameter of the element 20 sufficiently to form the tapered edge portions 26 which terminate in the feather edges 28 that are spaced apart the desired distance. The diameter of the cavities 90 and the thickness of the element 20 may be varied to obtain the desired relationship of the element 20 to the rollers 17.

Another radially retaining element 92 is illustrated in FIGS. 17–19 which is of a non-uniform thickness, having a central portion 94 which is of an increased thickness with respect to the portions 96 on opposite sides thereof. Consequently, when the tapered edge portions 98, like the portions 28 previously described, are formed on the element 92 at opposite sides of a roller retaining slot 100 therein, the portions 98 project inwardly of the slot the furthest over the widths of the central portions 94. The element 92 is particularly useful when the rollers 12 are of a ball shape since only the central sections of tapered edge portions can function as retainers for rollers of this shape as shown in FIG. 17.

In FIG. 21, the assembly 10 is illustrated with a modified radially retaining element 20e which is identical to the element 20 except that it has the tapered edge portions 26e of the slot 24e therein curved radially outwardly of the element 20e. The edge portions 26e are shaped so that during assembly of the rollers when a roller 12 is moved inwardly of a slot 24e bounded by edge portions 26e, the roller engages the inner sides of the portions 26e, and during inward movement of the roller the portions 26e deflect in a direction outwardly of the element 20e sufficiently to permit the roller 12 to pass therebetween. The edge portions 26e are thus deflectable, by virtue of their shape, to facilitate assembly of the rollers 12 with the element 20e.

In FIG. 22, the assembly 10a is illustrated with a modified radially retaining element 20f, which is identical to the element 20a except that it has the tapered edge portions 26f of the slot 24f therein curved radially inwardly. The edge portions 26f are shaped so that during assembly of the rollers, when a roller 12 is moved radially outwardly of a slot 24f, the roller engages the radially outer sides of the edge portions 26f at opposite sides of the slot 24f, and during outward movement of the roller the portions 26f deflect in a direction inwardly of the element 20f sufficiently to permit the roller 12 to pass therebetween. The edge portions 26f are thus deflectable to reduce the force required to move the roller 12 radially outwardly through the slot 24f into assembly with the cage assembly 10a.

From the above description, it is seen that this invention provides a cage assembly, many forms of which have been illustrated and described, which is in two parts, only one of which is deflected during assembly of the rollers with the cage. By constructing this single part so that it is of a large diameter to thickness ratio, and either has the tapered edge portions 26, which terminate in feather edges or is of a uniform thinness approximately the thinness of the feather edges, opposite edges of the roller receiving slots are readily deflectable sufficiently to permit insertion of the rollers 12 in the slots 24. Consequently, both parts in the assembly can be formed of a brittle material if necessary, since one part does not deflect or deform at all during assembly of the rollers, and the other part is thin enough to provide the necessary deflection. In other words, the cage assembly 10 effectively utilizes the concept that even the brittlest member is deflectable without breaking if it is long enough and thin enough. As a result, the materials from which the assembly 10 can be constructed are not limited to ductile materials and in many instances brittle materials may be desirable because of, for example, their ability to withstand extreme temperatures. Examples of materials from which the cage assembly 10 might be constructed are glass, ceramic materials, and plastic materials such as paper or fabric impregnated with phenol formaldehyde resins and compacted under heat, such as "Micarta," a material manufactured by Westinghouse Electric Corporation.

It will be understood that the specific construction of the improved bearing cage assembly which is herein disclosed and described is presented for purposes of explanation and illustration and is not intended to indicate limits of the invention, the scope of which is defined by the following claims.

What is claimed is:
1. In a bearing which includes rollers and means for retaining said rollers in predetermined spaced positions with respect to the bearing axis, said means comprising a first ring member having circumferentially spaced openings therein in which said rollers are located, and a second ring member adjacent to and concentric with said first ring and provided with circumferentially spaced openings disposed in radial alignment with said first openings, said second ring having retaining portions at circumferentially opposite sides of each opening which are deflectable in directions extending generally radially of said second ring and each said opening in said second ring having a profile defined by confronting ones of said retaining portions being similar to and slightly smaller than the projected profile of each of said rollers so that said rollers are movable in one direction substantially radially of said rings through said openings in said second ring to a position within the slots in said first ring and retained against movement in an opposite direction by said retaining portions.

2. In a bearing which includes rollers and means for retaining said rollers in predetermined spaced positions with respect to the bearing axis, said means comprising a first ring member having circumferentially spaced openings therein in which said rollers are located, and a second ring member adjacent to and spaced radially concentrically from said first ring and provided with circumferentially spaced openings disposed in radial alignment with said first openings, said second ring having a sufficiently high diameter to thickness ratio in view of the material from which the ring is constructed to provide for some deflection of the ring without fracture thereof, said second ring having tapered portions at circumferentially opposite sides of each opening which are deflectable in directions extending generally radially of said second ring so that a roller having a dimension in a direction parallel to a line extending between the tapered portions of an opening in said second ring slightly greater than the distance between said tapered portions is movable in one direction substantially radially of said rings to a position within the slots in said first ring and retained against movement in an opposite direction by said tapered edge portions.

3. In a bearing which includes rollers and means for retaining said rollers in predetermined spaced positions with respect to the bearing axis, said means comprising a first ring member having circumferentially spaced openings therein in which said rollers are located, and a second ring member adjacent to and concentric with said first ring and provided with circumferentially spaced openings disposed in radial alignment with said first openings, said second ring having a sufficiently high diameter to thickness ratio in view of the material from which the ring is constructed to provide for a predetermined deflection of the ring without fracture thereof, said rings being radially spaced a distance such that said said second ring is diametrically deflectable a distance less than said predetermined deflection, said second ring having tapered portions at circumferentially opposite sides of each opening which are deflectable in directions extending generally radially of said second ring so that a roller having a dimension in a direction parallel to a line extending between the tapered portions of an opening in said second ring slightly greater than the distance between said tapered portions is movable in one direction substantially radially of said rings to a position within the slots in said first ring and retained against movement in an opposite direction by said tapered edge portions.

4. In a bearing which includes rollers and means for retaining said rollers in predetermined spaced positions with respect to the bearing axis, said means comprising a first ring member having circumferentially spaced openings therein in which said rollers are located, and a second ring member adjacent to and radially concentrically spaced from said first ring and provided with circumferentially spaced openings disposed in radial alignment with said first openings, said second ring having edge portions at circumferentially opposite sides of each opening undercut and tapered to a feather edge so that the edge portions are deflectable in a direction extending generally radially of said second ring so that a roller having a dimension in a direction parallel to a line extending between the feather edge portions of an opening in said second ring slightly greater than the distance between said tapered portions is movable in one direction substantially radially of said rings to a position within the slots in said first ring and retained against movement in an opposite direction by said tapered edge portions.

5. In a bearing which includes an inner race, rollers, and means for retaining said rollers in engagement with said inner race and in predetermined spaced positions with respect to the bearing axis, said means comprising a roller spacing ring having circumferentially spaced openings therein in which said rollers are located and positioned concentrically about said inner race, and a retainer ring positioned adjacent to and spaced radially concentrically about said spacing ring and provided with circumferentially spaced openings disposed in radial alignment with said openings in the roller spacing ring, said retainer ring having tapered portions at circumferentially opposite sides of each opening which are deflectable in a direction generally radially of said retainer ring so that a roller having a dimension in a direction parallel to a line extending between the tapered portions of an opening in said second ring slightly greater than the distance between said tapered portions is movable in a direction radially inwardly of said rings to a position within the slots in said spacer ring in rolling engagement with said inner race and retained against movement in an opposite direction by said tapered edge portions.

6. In a bearing which includes an outer race, rollers, and means for retaining said rollers in engagement with said outer race and in predetermined spaced positions with respect to the bearing axis, said means comprising a roller spacing ring having circumferentially spaced openings therein in which said rollers are located and positioned concentrically within said inner race, and a retainer ring positioned adjacent to and spaced radially concentrically within said spacing ring and provided with circumferentially spaced openings disposed in radial alignment with said openings in the roller spacing ring, said retainer ring having tapered portions at circumferentially opposite sides of each opening which are deflectable in a direction generally radially of said retainer ring so that a roller having a dimension in a direction parallel to a line extending between the tapered portions of an opening in said retainer ring slightly greater than the distance between said tapered portions is movable radially outwardly of said rings to a position within a slot in said spacer ring in rolling engagement with said outer race and retained against movement in an opposite direction by said tapered edge portions.

7. In a bearing which includes rollers, a race member, and means for retaining said rollers in engagement with said race member and in predetermined spaced positions with respect to the bearing axis, said means comprising a first ring member having circumferentially spaced openings therein in which said rollers are located, and a second ring member adjacent to and concentric with said first ring and provided with circumferentially spaced openings disposed in radial alignment with said first openings, said second ring having tapered portions at circumferentially opposite sides of each opening which are deflectable in directions extending generally radially of said second ring so that a roller having a dimension in a direction parallel to a line extending between the tapered portions of an opening in said second ring slightly greater than the distance between said tapered portions is movable in one direction substantially radially of said rings to a position within the slots in said first ring and retained against movement in an opposite direction by said tapered edge portions, said race member being disposed concentrically with respect to said rings and in supporting engagement with said first ring member on a side of said first ring opposite to the side on which said second ring is disposed and located so that the rollers in rolling engagement therewith are in a clearance relation with said tapered portions.

8. In a bearing which includes an inner cone, tapered rollers, and means for retaining said rollers in engagement with said inner cone and in predetermined spaced positions with respect to the bearing axis, said means comprising a roller spacing ring having circumferentially spaced openings therein in which said rollers are located and positioned concentrically about said inner cone, and a retainer ring positioned adjacent to and concentrically about said spacing ring and provided with circumferentially spaced openings disposed in radial alignment with said openings in the roller spacing ring, said retainer ring having tapered portions at circumferentially opposite sides of each opening which are deflectable in a direction generally radially inwardly of said retainer rings so that a roller having dimensions in a plane parallel to a plane through the tapered portions of an opening in said second ring slightly greater than the distance between said tapered portions is movable radially inwardly of said rings to a position within a slot in said spacing ring and retained against movement in an opposite direction by said tapered edge portions.

9. In a bearing which includes an outer race, rollers, and means for retaining said rollers in engagement with said outer race and in predetermined spaced positions with respect to the bearing axis, said means comprising a roller spacing ring having circumferentially spaced openings therein in which said rollers are located and positioned concentrically within said outer race, said roller spacing ring having radially inwardly extending shaft guiding rims formed at axially spaced portions thereof, and a retainer member of split ring shape positioned adjacent to and concentrically within said spacing ring at a position between said rims and provided with circumferentially spaced openings disposed in radial alignment with said openings in the roller spacing ring, said retainer member having tapered portions at circumferentially opposite sides of each opening which are deflectable in a direction generally radially of said retainer member so that a roller having a dimension in a direction parallel to a line extending between the tapered portions of an opening in said second ring slightly greater than the distance between said tapered portions is movable in one direction radially of said rings to a position within the slots in said first ring and retained against movement in an opposite direction by said tapered edge portions.

10. In a cage and roller assembly, a roller spacing ring having a predetermined number of circumferentially spaced openings formed therein, a like number of rollers disposed in said openings in said spacing ring in a closely spaced relation with said spacing ring, and a pair of retainer rings positioned adjacent to and in a concentric relation with said spacing ring on opposite ends of the rollers therein, each of said retainer rings being provided with circumferentially spaced openings disposed in radial alignment with said openings in the roller spacing ring, one of said retainer rings having tapered portions at circumferentially opposite sides of each opening therein which are deflectable in a direction generally radially of said retainer ring so that a roller having a dimension in a direction parallel to a line extending between the tapered portions of an opening in said second ring slightly greater than the distance between said tapered portions is movable in one direction radially of said rings to a position within the slots in said spacing ring and retained against movement in an opposite direction by said tapered edge portions.

11. In a bearing which includes rollers, and means for retaining said rollers in predetermined spaced positions with respect to the bearing axis, said means comprising a roller spacing ring having circumferentially spaced openings therein in which said rollers are located, and a retainer ring positioned adjacent to and in a concentric relation with said spacing ring and provided with circumferentially spaced openings disposed in radial alignment with said openings in the roller spacing ring, said retainer ring having tapered portions at circumferentially opposite sides of each opening which are deflectable in a direction generally radially of said retainer ring so that a roller having a dimension in a direction parallel to a line extending between the tapered portions of an opening in said retainer ring slightly greater than the distance between said tapered portions is movable in one direction radially of said rings to a position within a slot in said spacer ring and retained against movement in an opposite direction by said tapered edge portions, the lengths of said tapered edge portions in a direction generally axially of said retainer ring being less than the lengths of said openings in said retainer ring measured in the same direction.

12. In a bearing which includes rollers, and means for retaining said rollers in predetermined spaced positions with respect to the bearing axis, said means comprising a roller spacing ring having circumferentially spaced openings therein in which said rollers are located, and a retainer ring positioned adjacent to and in a concentric relation with said spacing ring and provided with circumferentially spaced openings disposed in radial alignment with said openings in the roller spacing ring, said retainer ring having tapered portions at circumferentially opposite sides of each opening which are deflectable in a direction generally radially of said retainer ring so that a roller having a dimension in a direction parallel to a line extending between the tapered portions of an opening in said retainer ring slightly greater than the distance between said tapered portions in movable in one direction radially of said rings to a position within a slot in said spacer ring and retained against movement in an opposite direction by said tapered edge portions, said tapered edge portions consisting of a plurality of finger sections spaced apart in a direction generally axially of said retainer ring.

13. In a bearing which includes rollers, and means for retaining said rollers in predetermined spaced positions with respect to the bearing axis, said means comprising a roller spacing ring having circumferentially spaced openings therein in which said rollers are located, and a retainer ring positioned adjacent to and in a concentric relation with said spacing ring and provided with circumferentially spaced openings disposed in radial alignment with said openings in the roller spacing ring, said retainer ring having tapered portions at circumferentially opposite sides of each opening which are deflectable in a direction generally radially of said retainer ring so that a roller having a dimension in a direction parallel to a line extending between the tapered portions of an opening in said retainer ring slightly greater than the distance between said tapered portions is movable in one direction radially of said rings to a position within a slot in said spacer ring and retained against movement in an opposite direction by said tapered edge portions, said tapered portions being curved generally radially of said retainer ring in said opposite direction so that on movement of said roller in said one direction said tapered portions are movable in directions away from each other and in said opposite direction.

14. In a bearing which includes rollers and means for retaining said rollers in predetermined spaced positions with respect to the bearing axis, said means comprising a roller spacing ring having circumferentially spaced openings therein in which said rollers are located, and a retainer ring positioned adjacent to and in a concentric relation with said spacing ring and provided with circumferentially spaced openings disposed in radial alignment with said openings in the roller spacing ring, said retainer ring having undercut portions at circumferentially opposite sides of each opening which are tapered and deflectable in a direction generally radially of said retainer ring so that a roller having a dimension in a direction parallel to a line extending between the tapered portions of an opening in said retainer ring slightly greater than the distance between said tapered portions is movable in one direction radially of said rings to a position within a slot in said spacer ring and retained against movement in an opposite direction by said tapered edge portions, said retainer ring having a radially extending raised portion on the side thereof opposite said undercut, said raised portion being disposed substantially centrally of said retainer ring in a direction axially thereof and extending inwardly of each slot a distance further than the edge sections on opposite sides thereof.

15. In a cage and roller assembly, rollers, means for retaining said rollers in predetermined spaced positions with respect to the bearing axis, said means comprising a roller spacing ring having circumferentially spaced openings therein in which said rollers are located, said roller spacing ring having radially inwardly extending shaft-guiding rims formed at axially spaced portions thereof, a first retainer member of split ring shape supported on said ring and positioned adjacent to and concentrically within said spacing ring at a position between said rims, a second retainer member extending concentrically about and supported on said ring, said retainer members being provided with circumferentially spaced openings disposed in radial alignment with said openings in the roller spacing ring, said retainer members having tapered portions at circumferentially opposite sides of each opening which are deflectable in a direction generally radially of said retainer member so that a roller having a dimension in a direction parallel to a line extending between the tapered portions of an opening in said second ring slightly greater than the distance between said tapered portions is movable in one direction radially of said rings to a position within the slots in said first ring and retained against movement in an opposite direction by said tapered edge portions.

16. In a cage and roller assembly, a roller spacing ring having a predetermined number of circumferentially spaced openings formed therein, a like number of rollers disposed in said openings in said spacing ring in a closely spaced relation with said spacing ring, each of said openings being tapered in a direction radially of said ring and being of a width at one peripheral surface of said ring smaller than the diameter of the roller therein to prevent movement of said roller in one direction radially of said ring, a retainer ring supported on the opposite peripheral surface of said ring in a concentric relation with said spacing ring, said retainer ring being provided with circumferentially spaced openings disposed in radial alignment with said openings in the roller spacing ring and having tapered portions at circumferentially opposite sides of each opening which are deflectable in a direction generally radially of said retainer ring so that a roller having a dimension in a direction parallel to a line extending between the tapered portions of an opening in said retainer ring slightly greater than the distance between said tapered portions is movable in one direction radially of said rings to a position within the slots in said spacing ring and retained against movement in an opposite direction by said tapered edge portions.

17. A bearing which includes rollers, comprising retaining means for radially retaining the rollers in predetermined spaced positions with respect to the bearing axis and guide means for circumferentially guiding the rollers about the bearing axis, said retaining means and said guide means comprising a pair of concentrically disposed radially spaced ring members, one of said pair of ring members for circumferentially guiding the rollers and having a plurality of pockets each for receiving one of the rollers with a minimum clearance and with said pockets each having a profile similar to and slightly larger than the projected profile of each of said rollers, and the other of said pair of ring members for only radially retaining the plurality of rollers within said first ring member and having a plurality of openings axially defined by retaining portions having a preselected interference fit relative to the profile of said rollers and with said retaining portions being spaced sufficiently to be in clearance relationship with said rollers upon assembly of the rollers with said retaining means and said guide means.

References Cited in the file of this patent

UNITED STATES PATENTS

| | | |
|---|---|---|
| 1,734,222 | Marles | Nov. 5, 1929 |
| 1,911,544 | Beard | May 30, 1933 |
| 2,166,377 | Scribner | July 18, 1939 |
| 2,765,203 | Barr et al. | Oct. 2, 1956 |
| 2,772,128 | Schaeffler | Nov. 27, 1956 |
| 2,976,092 | Anderson | Mar. 21, 1961 |

FOREIGN PATENTS

| | | |
|---|---|---|
| 564,342 | Great Britain | Sept. 22, 1944 |

UNITED STATES PATENT OFFICE
CERTIFICATE OF CORRECTION

Patent No. 3,051,534                        August 28, 1962

Theodor B. Kohler et al.

It is hereby certified that error appears in the above numbered patent requiring correction and that the said Letters Patent should read as corrected below.

Column 12, line 74, after "for" insert -- only --; column 13, line 4, strike out "only".

Signed and sealed this 30th day of July 1963.

(SEAL)
Attest:

ERNEST W. SWIDER
Attesting Officer

DAVID L. LADD
Commissioner of Patents